United States Patent
Ouchi et al.

(10) Patent No.: US 10,195,813 B2
(45) Date of Patent: Feb. 5, 2019

(54) HONEYCOMB STRUCTURE AND MANUFACTURING METHOD OF HONEYCOMB STRUCTURE

(71) Applicant: NGK INSULATORS, LTD., Nagoya (JP)

(72) Inventors: Takahiro Ouchi, Nagoya (JP); Shuichi Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 175 days.

(21) Appl. No.: 15/077,033

(22) Filed: Mar. 22, 2016

(65) Prior Publication Data
US 2016/0288449 A1    Oct. 6, 2016

(30) Foreign Application Priority Data
Mar. 31, 2015 (JP) .................. 2015-071540

(51) Int. Cl.
  *B32B 3/12* (2006.01)
  *B32B 37/06* (2006.01)
  (Continued)

(52) U.S. Cl.
  CPC ............ *B32B 3/12* (2013.01); *B01D 46/2429* (2013.01); *B32B 37/06* (2013.01); *B32B 37/146* (2013.01);
  (Continued)

(58) Field of Classification Search
  CPC ............... F01N 2330/48; F01N 3/0222; F01N 2330/60; F01N 2330/06; Y02T 10/20; C04B 35/653; C04B 38/0006; C04B 2211/00405; C04B 2235/3481; C04B 2235/428; C04B 2235/788; C04B 35/565;
  (Continued)

(56) References Cited

U.S. PATENT DOCUMENTS 6,258,433 B1    7/2001  Okuda et al.
2008/0295469 A1  12/2008  Mizuno et al.
(Continued)

FOREIGN PATENT DOCUMENTS

EP    2 174 701 A1    4/2010
EP    2 502 661 A2    9/2012
(Continued)

OTHER PUBLICATIONS

Extended European Search Report (Application No. 16163151.0 dated Oct. 13, 2016.
(Continued)

*Primary Examiner* — Michael E. La Villa
(74) *Attorney, Agent, or Firm* — Burr & Brown, PLLC

(57) ABSTRACT

A honeycomb structure includes latticed partition walls defining a plurality of polygonal cells which extends from one end face to the other end face and forms through channels for fluid, the partition walls are porously formed by using aggregates and a bonding material different from a material of the aggregates, and the partition walls have a relation indicating that a surface porosity of a surface region from a partition wall surface of each of the partition walls to a depth of 15% of a partition wall thickness T and an inner porosity of an inner region from the partition wall surface to a depth of 15% to 50% of the partition wall thickness are different from each other, and a difference obtained by subtracting the surface porosity from the inner porosity is in excess of 1.5%.

8 Claims, 3 Drawing Sheets

(51) Int. Cl.

| | |
|---|---|
| *B32B 37/14* | (2006.01) |
| *C04B 35/195* | (2006.01) |
| *C04B 35/653* | (2006.01) |
| *C04B 38/00* | (2006.01) |
| *F01N 3/022* | (2006.01) |
| *B01D 46/24* | (2006.01) |
| *C04B 35/565* | (2006.01) |
| *C04B 111/00* | (2006.01) |

(52) U.S. Cl.
CPC .......... *C04B 35/195* (2013.01); *C04B 35/565* (2013.01); *C04B 35/653* (2013.01); *C04B 38/0006* (2013.01); *F01N 3/0222* (2013.01); *B01D 2046/2433* (2013.01); *B01D 2046/2437* (2013.01); *C04B 2111/00405* (2013.01); *C04B 2235/349* (2013.01); *C04B 2235/3481* (2013.01); *C04B 2235/428* (2013.01); *C04B 2235/526* (2013.01); *C04B 2235/5208* (2013.01); *C04B 2235/5228* (2013.01); *C04B 2235/5292* (2013.01); *C04B 2235/5296* (2013.01); *C04B 2235/5436* (2013.01); *C04B 2235/788* (2013.01); *F01N 2330/06* (2013.01); *F01N 2330/48* (2013.01); *F01N 2330/60* (2013.01); *Y02T 10/20* (2013.01); *Y10T 428/1234* (2015.01); *Y10T 428/12042* (2015.01); *Y10T 428/12479* (2015.01)

(58) Field of Classification Search
CPC ............ C04B 35/195; C04B 2235/349; C04B 2235/5208; C04B 2235/5228; C04B 2235/526; C04B 2235/5292; C04B 2235/5296; C04B 2235/5436; B01D 46/2429; B01D 2046/2433; B01D 2046/2437; B32B 3/12; B32B 37/146; B32B 37/06; Y10T 428/1234; Y10T 428/12042; Y10T 428/12479
See application file for complete search history.

(56) References Cited

U.S. PATENT DOCUMENTS

| | | |
|---|---|---|
| 2012/0240541 A1 | 9/2012 | Isoda et al. |
| 2013/0255207 A1 | 10/2013 | Izumi et al. |
| 2013/0330530 A1 | 12/2013 | Okuya et al. |

FOREIGN PATENT DOCUMENTS

| | | |
|---|---|---|
| EP | 2 617 696 A1 | 7/2013 |
| JP | 2000-113513 A1 | 4/2000 |
| JP | 2010-110750 A1 | 5/2010 |
| JP | 2013-202503 A1 | 10/2013 |

OTHER PUBLICATIONS

Japanese Office Action (Application No. 2015-071540) dated May 16, 2017.

HONEYCOMB STRUCTURE AND MANUFACTURING METHOD OF HONEYCOMB STRUCTURE

The present application is an application based on JP 2015-071540 filed on Mar. 31, 2015 with the Japan Patent Office, the entire contents of which are incorporated herein by reference.

BACKGROUND OF THE INVENTION

Field of the Invention

The present invention relates to a honeycomb structure, and a manufacturing method of the honeycomb structure. More particularly, it relates to a honeycomb structure which is usable in a DPF to trap a particulate matter (PM) included in an exhaust gas, and a manufacturing method of the honeycomb structure.

Description of the Related Art

Heretofore, a honeycomb structure made of ceramics has broadly been used in a use application such as a car exhaust gas purifying catalyst carrier, a diesel particulate removing filter, or a heat reservoir for a burning device. The honeycomb structure made of the ceramics (hereinafter simply referred to as "the honeycomb structure") is manufactured through a firing step of firing, at a high temperature, a honeycomb formed body obtained by extruding a forming material (a kneaded material) into a desirable honeycomb shape by use of an extruder.

A diesel engine has a suitable thermal efficiency as compared with a gasoline engine, and has advantages as the engine for a car which matches a request for decrease of carbon dioxide emissions as a countermeasure against global warming. However, there is the problem that a particulate matter (PM) is included in an exhaust gas. This particulate matter is mainly constituted of carbon particulates of soot and the like, and the emitting of the particulate matter as it is to the atmosphere causes a serious environmental pollution. Therefore, in recent years, strict emission regulations have been performed concerning the particulate matter, and in addition to the conventional emission regulation based on a mass of the particulate matter, the emission regulation based on the number of particulates of the particulate matter has been performed in Europe and the like.

To cope with the regulations, a large number of particulates of the particulate matter included in the exhaust gas are trapped and removed before emitted to the atmosphere, by use of the diesel particulate removing filter (a diesel particulate filter (DPF)).

As the DPF, a wall flow type filter using a honeycomb structure is often used, because a high PM trapping efficiency can be obtained while suppressing a pressure loss in an allowable range. This honeycomb structure includes latticed porous partition walls defining a plurality of polygonal cells which extends from one end face to the other end face and becomes through channels for fluid, and a plurality of plugging portions is disposed to plug one open end of each of predetermined cells and the other open end of the residual cells in accordance with a predetermined arrangement. Further, the exhaust gas introduced into the cells passes the partition walls, and is then emitted from the open end of the cells in which the plugging portions are not disposed. Therefore, when the exhaust gas passes the partition walls, the partition walls function as a filter portion to trap the particulate matter in the partition walls.

As the honeycomb structure for use in the DPF, there has been suggested, for example, a honeycomb structure formed to include aggregates which are made of silicon carbide containing refractory particles and a bonding material which is made of metal silicon and bonds the aggregates to one another (see Patent Document 1). This suggestion has advantages that firing at a comparatively low temperature is enabled and that the above honeycomb structure can be manufactured while suppressing manufacturing cost. On the other hand, a honeycomb structure is known in which a PM trapping layer having an average pore diameter smaller than an average pore diameter of partition walls is formed on partition walls of a catalyst carrier filter including a honeycomb structure substrate (see Patent Document 2). In consequence, increase of the pressure loss can be suppressed, a burning rate of the particulate matter can be increased, and a regeneration efficiency can improve.

[Patent Document 1] JP-A-2000-113513
[Patent Document 2] JP-A-2010-110750

SUMMARY OF THE INVENTION

In recent years, for the above honeycomb structure, further improvement of a performance such as a durability has been required. For example, there are required improvement of a maximum amount of soot to be deposited (a soot mass limit (SML)) of a particulate matter such as the soot to be deposited in the honeycomb structure, improvement of a trapping efficiency of the particulate matter and decrease of a pressure loss. In consequence, it is possible to decrease a frequency of a regeneration treatment of burning, at a high temperature, the particulate matter of the soot and the like deposited in partition walls to remove the particulate matter, it is also possible to clear an emission regulation based on the number of particulates of the particulate matter, and it is further possible to achieve increase of a fuel efficiency and enhancement of an output of a diesel engine.

The soot mass limit is an index of the durability of the honeycomb structure, and indicates the maximum amount of the particulate matter to be deposited at which damages such as cracks are not generated in the honeycomb structure. In a case where the honeycomb structure is used as a DPF and a treatment of an exhaust gas is continuously carried out over a long period of time, it is necessary to carry out the regeneration treatment of the DPF at a predetermined interval. That is, the regeneration treatment of burning and removing the deposited particulate matter with a high-temperature gas is carried out to decrease the pressure loss increased due to the particulate matter deposited in the partition walls of the DPF and to return a purifying performance to its original performance. At this time, by burning heat of the particulate matter, thermal stress might be generated in the DPF and the cracks and the like might be generated in the DPF.

That is, the soot mass limit (SML) is defined as the maximum amount of the soot to be deposited at which the generation of the cracks or the like does not occur in the honeycomb structure in the above regeneration treatment, and it is considered that the honeycomb structure having a large value of the soot mass limit is excellent in durability. Here, for the purpose of preventing the generation of the cracks and the like, a porosity of the partition walls of the honeycomb structure is decreased to increase a heat capacity of the honeycomb structure, thereby inhibiting temperature rise during the regeneration treatment. However, the decrease of the porosity of the honeycomb structure causes the problem that pores of the partition walls are easy to be closed with the trapped particulate matter to increase the pressure loss. In particular, it is known that when the pores in the partition walls are clogged with the particulate matter, the pressure loss rapidly increases.

Therefore, the increase of the soot mass limit (the improvement of the durability of the honeycomb structure) and the inhibition of the increase of the pressure loss are contrary to each other, and it has been remarkably difficult to simultaneously solve these problems. It is to be noted that a catalyst loaded filter (a ceramic filter) disclosed in Patent Document 2 can solve the above contrary problems, but to manufacture the filter, a PM trapping layer is prepared by adding a pore former to a substrate, the PM trapping layer and/or partition walls are further coated with a catalyst, and then the pore former is burnt and flied during catalyst baking, to form pores in the PM trapping layer, which causes the possibility that manufacturing steps of the catalyst loaded filter become complicated. As a result of earnest study, the present applicants have investigated control of fine structures of partition wall surfaces and partition wall inner portions of partition walls of a honeycomb structure, and have found that the honeycomb structure possessing an inner structure different from a conventional honeycomb structure can be formed by adding, to a forming material, a bonding aid which controls the formation of the pores during firing of a honeycomb formed body without adding any special complicated steps.

The present invention has been developed in view of the above situations, and objects thereof are to provide a honeycomb structure which increases a soot mass limit while inhibiting increase of a pressure loss and has a high durability, and to provide a manufacturing method of the honeycomb structure.

According to the present invention, there are provided a honeycomb structure mentioned below, and a manufacturing method of the honeycomb structure.

According to a first aspect of the present invention, the honeycomb structure is provided including latticed partition walls defining a plurality of polygonal cells which extends from one end face to the other end face and form through channels for fluid, wherein the partition walls are porously formed by using aggregates and a bonding material different from a material of the aggregates, and the partition walls have a relation indicating that a surface porosity of a surface region from a partition wall surface of each of the partition walls to a depth of 15% of a partition wall thickness and an inner porosity of an inner region from the partition wall surface to a depth of 15% to 50% of the partition wall thickness are different from each other, and a difference obtained by subtracting the surface porosity from the inner porosity is in excess of 1.5%.

According to a second aspect of the present invention, the honeycomb structure according to the above first aspect is provided, wherein the surface porosity is in a range of 10% to 50% and the inner porosity is in a range of 20% to 75%.

According to a third aspect of the present invention, a honeycomb structure is provided including latticed partition walls defining a plurality of polygonal cells which extends from one end face to the other end face and form through channels for fluid, wherein the partition walls are porously formed by using aggregates and a bonding material different from a material of the aggregates, and the partition walls have a relation indicating that a surface porosity of a surface region from a partition wall surface of each of the partition walls to a depth of 15% of a partition wall thickness and an inner porosity of an inner region from the partition wall surface to a depth of 15% to 50% of the partition wall thickness are different from each other, and a difference obtained by subtracting a surface average pore diameter of the surface region from an inner average pore diameter of the inner region is in excess of 0.5 micrometer.

According to a fourth aspect of the present invention, the honeycomb structure according to the above third aspect is provided, wherein the surface average pore diameter is in a range of 5 to 40 micrometers and the inner average pore diameter is in a range of 8 to 50 micrometers.

According to a fifth aspect of the present invention, the honeycomb structure according to any one of the above first to fourth aspect is provided, wherein the bonding material is at least one selected from the group consisting of metal silicon and cordierite.

According to a sixth aspect of the present invention, the honeycomb structure according to any one of the above first to fifth aspects is provided, wherein the aggregates have a melting point higher than the bonding material, are formed with uniform particle diameters, and have an average particle diameter in a range of 10 to 60 micrometers.

According to a seventh aspect of the present invention, a manufacturing method of a honeycomb structure in which the honeycomb structure according to any one of the above first to sixth aspect is manufactured, the method including a forming material providing step of mixing aggregates, a bonding material different from a material of the aggregates, and a bonding aid to form a forming material; a forming step of extruding the provided forming material to form a honeycomb formed body; and a firing step of firing the provided honeycomb formed body to form a honeycomb structure, wherein in the forming material provided step, anisotropic particles are used as the bonding aid in which an average size of major axis of the particles is at least 5 micrometers or more, an aspect ratio of the average size of the major axis to an average size of the minor axis is at least 5 or more, and a melting point is lower than that of the bonding material, and the bonding aid is added to and mixed with the aggregates and the bonding material having the melting point lower than the aggregates, and in the firing step, the firing is performed at a firing temperature higher than the melting point of the bonding material.

According to a honeycomb structure of the present invention and a manufacturing method of the honeycomb structure, anisotropic particles such as mica are added as a bonding aid to a forming material to be extruded, so that a porosity and a pore diameter of a partition wall surface can be decreased as compared to a partition wall inner portion of the honeycomb structure.

As a result, an average porosity of the whole honeycomb structure can be minimized, and a durability of the honeycomb structure can be improved by increasing a heat capacity. Furthermore, a particulate matter can be retained in the partition wall surfaces by decreasing the porosity and the pore diameter of the partition wall surfaces of the honeycomb structure, increase of a pressure loss can be inhibited by preventing pores in the partition walls from being closed, and a trapping performance of the particulate matter can be improved by forming a particulate matter layer on the partition wall surfaces. It is to be noted that in the manufacturing method of the honeycomb structure, the honeycomb structure which produce the above excellent effects can be manufactured without using a film preparing step.

DESCRIPTION OF THE PREFERRED EMBODIMENTS

Figure 1:
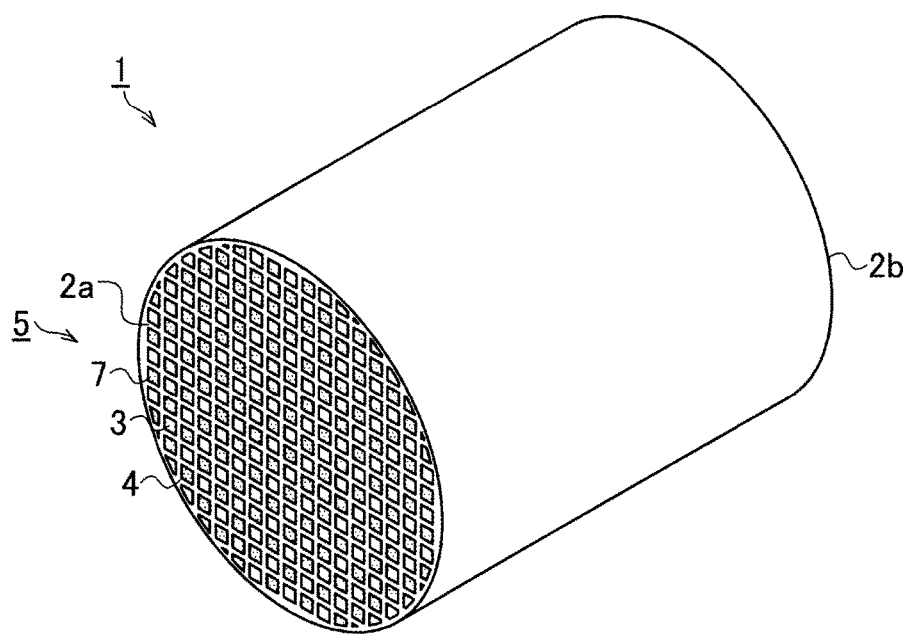
FIG. 1 is a perspective view schematically showing one example of a schematic constitution of a honeycomb structure of the present embodiment.
Figure 2:
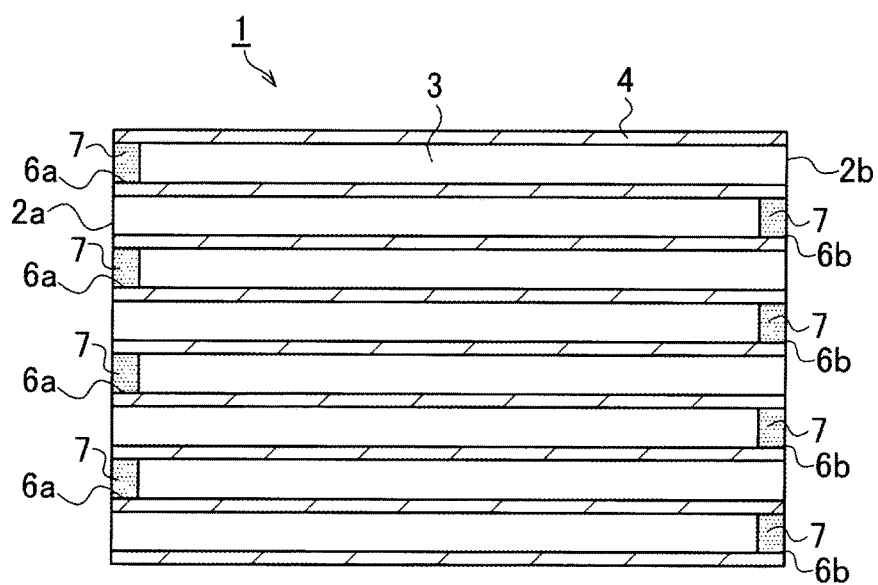
FIG. 2 is a schematic cross-sectional view schematically showing a part of a cross section of the honeycomb structure which is parallel along a central axis direction.
Figure 3:
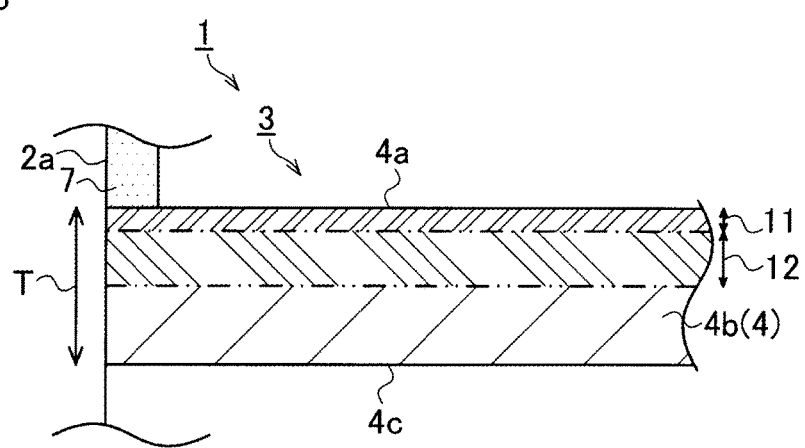
FIG. 3 is an enlarged schematic cross-sectional view schematically showing an enlarged part of the cross section of the honeycomb structure which is parallel along the central axis direction.

Hereinafter, embodiments of a honeycomb structure of the present invention and a manufacturing method of the honeycomb structure will be described with reference to the drawings, respectively. It is to be noted that the honeycomb structure of the present invention and the manufacturing method of the honeycomb structure are not limited to the following embodiments, and changes, modifications, improvements and the like can suitably be added without departing from the gist of the invention.

As shown in FIG. 1 to FIG. 4, a honeycomb structure 1 of one embodiment of the present invention has a honeycomb structure body 5 including latticed partition walls 4 defining a plurality of polygonal cells 3 which extends from one end face 2a to the other end face 2b and forms through channels for fluid, and plugging portions 7 formed to close one open end 6a of each of the predetermined cells 3 and the other open end 6b of the residual cells 3 in the plurality of cells 3 constituting the honeycomb structure body 5, respectively, in accordance with a predetermined regular arrangement. The plugging portions 7 of the present embodiment are formed to plug one open end 6a (or the other open end 6b) of the cells 3 adjacent to each other, i.e., alternately plug the open ends of the cells (e.g., see FIG. 2).

The honeycomb structure 1 is manufactured by extruding a forming material 10 in which aggregates 8, a bonding material 9 different from a material of the aggregates 8 and a bonding aid 13 are mixed and kneaded, into a desirable honeycomb shape by use of an extruder to form a honeycomb formed body (a forming step), and firing the obtained honeycomb formed body at a predetermined firing temperature (a firing step). A DPF is prepared by using the manufactured honeycomb structure 1. An exhaust gas of a diesel engine is introduced from one end of this DPF, so that a particulate matter of soot or the like included in the exhaust gas can be trapped by the porous partition walls 4 while the exhaust gas passes the partition walls 4.

The latticed partition walls 4 constituting the honeycomb structure 1 are mainly constituted of the aggregates 8 and the bonding material 9, and silicon carbide (SiC) is used as the aggregates. Here, an average size of the aggregates 8 is in a range of 10 to 60 micrometers. On the other hand, as the bonding material 9, metal silicon (Si) or cordierite is used, and the material having an average particle diameter smaller than that of the aggregates 8 is used. In consequence, silicon carbide as the aggregates 8 is bonded by metal silicon or the like which is the bonding material, and the partition walls 4 are formed.

Furthermore, according to the honeycomb structure 1 of the present embodiment, in a partition wall thickness T (see FIG. 3) from a partition wall surface 4a of the partition wall 4 to a partition wall back surface 4c, a surface porosity A concerned with a porosity of a region (a surface region 11) of a partition wall inner portion 4b from the partition wall surface 4a to a depth of 15% and an inner porosity B concerned with a porosity of a region (an inner region 12) of the partition wall inner portion 4b from the partition wall surface 4a to a depth of 15% to 50% of the partition wall thickness T indicate values different from each other, and the value of the inner porosity B is larger than that of the surface porosity A. That is, the porosity of the inner region 12 is higher than that of the surface region 11.

The surface porosity A mentioned above is in a range of 10% to 50% and further preferably in a range of 30% to 40%. On the other hand, the inner porosity B is in a range of 20% to 75% and further preferably in a range of 35% to 45%. Additionally, a relation between the surface porosity A and the inner porosity B indicates that a difference obtained by subtracting the surface porosity A from the inner porosity B is in excess of 1.5% ("the inner porosity B–the surface porosity A>1.5%").

In the honeycomb structure 1, a surface average pore diameter C concerned with an average pore diameter of the surface region 11 of the partition wall 4 and an inner average pore diameter D concerned with an average pore diameter of the inner region 12 indicate different values, and the value of the inner average pore diameter D is larger than that of the surface average pore diameter C. Here, the average pore diameter is calculated on the basis of an average distribution of respective pores of each of the surface region 11 and the inner region 12. That is, the average pore diameter of the inner region 12 is larger than that of the surface region 11, and in accordance with the above value of the porosity, the pores having large pore diameters occupy the inner region 12.

The surface average pore diameter C mentioned above is in a range of 5 to 40 micrometers and further preferably in a range of 10 to 25 micrometers. On the other hand, the inner average pore diameter D is in a range of 8 to 50 micrometers and further preferably in a range of 20 to 30 micrometers. Additionally, a relation between the surface average pore diameter C and the inner average pore diameter D indicates that a difference obtained by subtracting the surface average pore diameter C from the inner average pore diameter D is in excess of 0.5 micrometer ("the inner average pore diameter D–the surface average pore diameter C>0.5 micrometer").

The forming material 10 is obtained by mixing and kneading the aggregates 8, the bonding material 9 and the bonding aid 13 (a forming material providing step). As the bonding aid 13, anisotropic particles are used, and the anisotropic particles are, for example, plate-shaped (thin plate-shaped) mica, rod-shaped (fibrous) Al—Si fibers or the like. Here, there is used the bonding aid 13 in which an average size in a major axis direction is a size of at least 5 micrometers or more and an aspect ratio of the average size in the major direction to an average size in a minor axis direction is 5 or more. Additionally, in the case of the fibers, diameters are defined as the above minor axis. Furthermore, there is used the bonding aid 13 in which a melting point is lower than a melting point of the bonding material 9 (e.g., metal silicon) to be added and a blend ratio is adjusted in a range of 3.0 wt. % to 10.0 wt. %.

There will be summarized relations in average particle diameter and melting point among the aggregates 8, the bonding material 9 and the bonding aid 13 for use in the forming material 10. As to the size of the average particle diameter, the bonding aid 13 is larger than the bonding material 9, and the melting point is higher in order of the aggregates 8, the bonding material, and the bonding aid 13.

In a firing step to manufacture the honeycomb structure 1, the firing is performed at a firing temperature higher than the melting point of the bonding material 9.

In the honeycomb structure 1 of the present embodiment in which the above constitution is employed, a trapping efficiency of the particulate matter (the soot) can be improved, increase of a pressure loss can be inhibited, and further, trapping leakage number concentration of the particulate matter can be minimized. In particular, the anisotropic particles of mica or the like are added as the bonding aid 13 to the bonding material 9 included in the forming material 10 at a predetermined blend ratio, and the firing is performed at a firing temperature higher than the melting point of the bonding material 9, so that the surface porosity A and the surface average pore diameter C of the surface region 11 can indicate values smaller than those of the inner porosity B and the inner average pore diameter D of the inner region 12 of the partition wall 4 of the honeycomb structure 1, respectively.

That is, the bonding aid 13 is added as the anisotropic particles to the forming material 10, and the porosities and the average pore diameters of the surface region 11 and the inner region 12 of the partition wall 4 are controlled, so that the abovementioned relations can be indicated.

In consequence, the particulate matter in the exhaust gas introduced into the DPF formed by using the honeycomb structure 1 is easy to be trapped by the partition wall surface 4a of the partition wall 4 in which the average pore diameter and the porosity are small. That is, the trapping efficiency can be increased, the pores of the partition wall inner portion 4b of the partition wall 4 are hard to be closed with the particulate matter, and hence the increase of the pressure loss can be inhibited. Furthermore, the porosity of the partition wall surface 4a is low, and hence a heat capacity can be increased in the whole partition wall 4, and a soot mass limit can be increased. In the honeycomb structure 1 of the present embodiment, the porosity of the whole partition wall 4 does not decrease, but the porosity of the surface region 11 from the partition wall surface 4a to the depth of 15% is decreased to a limited extent, and in the inner region 12 to the depth of 15% to 50%, the values of the inner porosity B and the inner average pore diameter D are kept at constant levels to the surface region 11.

The particulate matter of the soot or the like forms a deposited layer (not shown) on the partition wall surface 4a to prevent the pores of the partition wall inner portion 4b from being closed, and hence the increase of the pressure loss due to the exhaust gas introduced into the honeycomb structure 1 can be inhibited. The average pore diameter and the porosity of the partition wall inner portion 4b are large, which also contributes to the prevention of the closing of the pores in the partition wall inner portion 4b. It is to be noted that a depth region (not shown) of 50% to 85% of the partition wall surface 4a (corresponding to 15% to 50% of the partition wall back surface 4c) and a depth region (not shown) of 85% to 100% of the partition wall surface 4a (15% from the partition wall back surface 4c) indicate the same constitutions as in the inner region 12 and the surface region 11, respectively.

Figure 4:
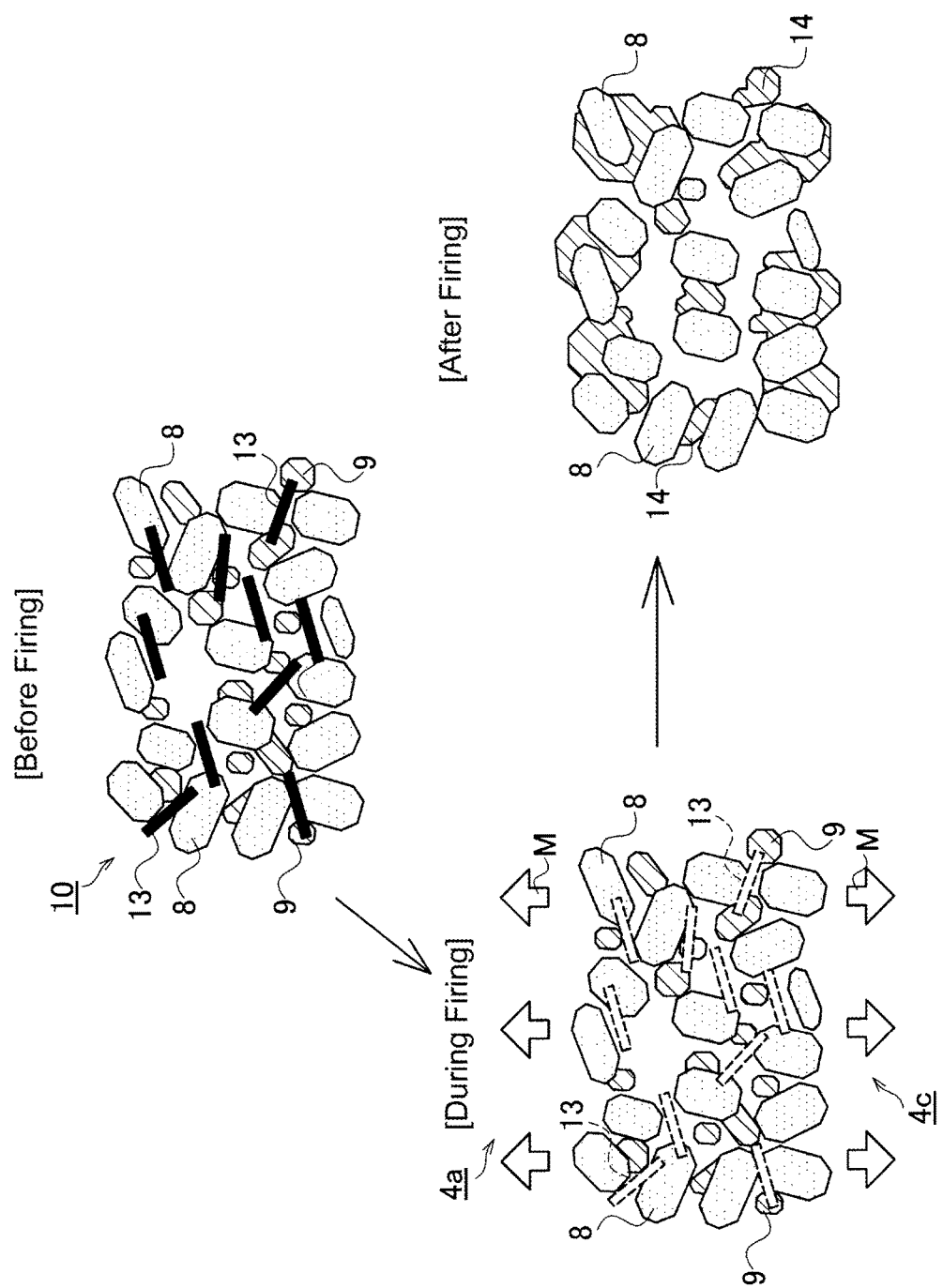
FIG. 4 is an explanatory view schematically showing a presumed behavior mechanism of aggregates, a bonding material, and anisotropic particles before firing, during the firing, and after the firing.

Hereinafter, in the manufacturing method of the honeycomb structure of the present embodiment, with reference to FIG. 4, there will be described a presumed behavior mechanism of the aggregates 8, the bonding material 9 and the bonding aid 13 in a case where the anisotropic particles are added as the bonding aid 13 to the forming material 10 and the firing is performed at a firing temperature higher than the melting point of the bonding material 9 and the bonding aid 13. FIG. 4 illustrates that silicon carbide is used as the aggregates 8, metal silicon is used as the bonding material 9 and thin plate-shaped mica is used as the bonding aid 13.

The melting point of metal silicon (the bonding material 9) is about 1300° C., and the melting point of mica (the bonding aid 13) is lower than that of metal silicon and between 1200° C. and 1300° C. Furthermore, the melting point of silicon carbide (the aggregates 8) is higher than that of metal silicon. It is to be noted that to simplify the description, drawing of a raw material other than the above three components is omitted in the forming material 10.

First, three components of the aggregates 8, the bonding material 9 and the bonding aid 13 are mixed and kneaded at the predetermined blend ratio, to form the forming material 10 in which the above three components are uniformly mixed (the forming material providing step and a bonding aid adding step). At this time, the average size of the bonding aid 13 is adjusted to be larger than the average size of the bonding material 9. Therefore, at least a part of the bonding material 9 comes in contact with the bonding aid 13 having a large average particle diameter and is bound (see "before firing" in FIG. 4). In this state, the material is extruded by using an extruder, to form the honeycomb formed body (the forming step). The obtained honeycomb formed body is sent to the firing step.

The honeycomb formed body sent to the firing step is thrown into a firing furnace set at a predetermined firing temperature. In the present embodiment, the firing temperature is set at 1300° C. or more. In the forming material 10 constituting the honeycomb formed body thrown into the firing furnace, the bonding aid 13 having the lowest melting point first starts melting. At this time, the molten bonding aid 13 moves from the partition wall inner portion 4b toward the partition wall surface 4a (corresponding to the upside of paper surface in FIG. 4) or the partition wall back surface 4c (corresponding to the downside of the paper surface in FIG. 4).

At this time, with the movement of the bonding aid 13, a force acts so that the bonding material 9 bound by the bonding aid 13 moves along moving directions M (see FIG. 4) of the bonding aid 13. In consequence, the bonding aid 13 and the bonding material 9 move from the inner region 12 of the partition wall inner portion 4b to the surface region 11 in the vicinity of the partition wall surface 4a (or the partition wall back surface 4c).

Furthermore, when the firing temperature heightens in excess of the melting point of the bonding material 9, the bonding material 9 melts. The bonding aid 13 and the bonding material 9 melt, to bond the aggregates 8 in a state where these bonding aid and bonding material are moved to the partition wall surface 4a (or the partition wall back surface 4c). The honeycomb structure 1 discharged from the firing furnace is gradually cooled to the vicinity of room temperature. Consequently, it is considered that the bonding aid 13 and the bonding material 9 moved to the partition wall surface 4a or the like coagulate to form a bonding portion 14 which bonds the aggregates 8 of silicon carbide to one another.

As a result, the surface region 11 of the partition wall surface 4a (or the partition wall back surface 4c) possesses a densified structure as compared with the inner region 12 of the partition wall inner portion 4b, and the partition wall 4 is formed in which a large number of pores having large pore diameters are formed in the partition wall inner portion 4b. Therefore, the porosities and average pore diameters can be controlled to vary in the surface region 11 and the inner region 12.

As described above, according to the honeycomb structure 1 of the present embodiment and the manufacturing method of the honeycomb structure, the honeycomb structure 1 can be manufactured by using the forming material 10 to which the bonding aid 13 of mica or the like having an aspect ratio of 5 or more is added. Consequently, in the surface region 11 and the inner region 12 of the partition wall 4, the porosities and the average pore diameters can be varied, respectively, and differences in porosity and average pore diameter of the surface region 11 to the inner region 12 can be adjusted to be definite values or more. As a result, it is possible to inhibit the increase of the pressure loss, increase the soot mass limit and provide a high durability, and it is further possible to increase the trapping efficiency of the particulate matter and to clear emission regulations based on the number of particulates of the particulate matter in Europe and the like.

Hereinafter, examples of the honeycomb structure of the present invention and the manufacturing method of the honeycomb structure will be described, but the honeycomb structure of the present invention and the manufacturing method of the honeycomb structure are not limited to these examples.

EXAMPLES (1) Honeycomb Structure

Aggregates, a bonding material and a bonding aid including anisotropic particles were blended at a predetermined ratio, an organic binder, a surfactant and water were added, uniformly mixed and kneaded, and a forming material obtained in this manner was extruded by utilizing an extruder, to obtain a honeycomb formed body. The obtained honeycomb formed body was cut, dried, and then plugged, and firing was performed at a predetermined firing temperature, to obtain a segmented honeycomb structure. The honeycomb structure segments were bonded by using a bonding material, and then circumference grinding and circumference coating were performed, thereby preparing honeycomb structures of examples in the present invention and comparative examples.

In the present example, for the honeycomb structures, silicon carbide was used as aggregates in each of Examples 1 to 17 and Comparative Examples 1 to 13, metal silicon was used as the bonding material in Examples 1 to 8, Examples 15 to 17, Comparative Example 1, Comparative Examples 3 to 7 and Comparative Examples 10 to 13, and cordierite was used as the bonding material in Examples 9 to 14, Comparative Example 2 and Comparative Examples 8 and 9. A ratio between the aggregates and the bonding material was 75/25 in each example. Furthermore, as the bonding aid, mica was used in Examples 1 to 14 and Comparative Examples 6 to 13, Al—Si fibers were used in Examples 15 to 17, and talc was used in Comparative Examples 3 to 5. Additionally, in Comparative Examples 1 and 2, the bonding aid was not added to the forming material. In each of the honeycomb structures of the examples and the comparative examples, a diameter was 144 mm, a length was 152 mm, a partition wall thickness of a cell structure was 0.3 mm, and a cell density was 46.5 cells/cm$^2$.

Table 1 mentioned below shows a ratio (75/25) between the above aggregates and the bonding material, particle diameters (μm) of the aggregates, particle shapes of the bonding aid, types of bonding aid, long axis side particle diameters (μm), and blend ratios (wt. %), and a summary of measurement results of porosities (%) of a surface region and an inner region of each obtained honeycomb structure, average pore diameters (μm) of the surface region and the inner region, pressure losses (kPa), and PN leakage numbers (particulates). Additionally, Table 2 mentioned below shows a summary of respective average particle diameters of silicon carbide used as the aggregates, metal silicon used as the bonding material, alumina in cordierite used as the bonding material, and talc in cordierite used as the bonding material, and two types of mica, talc and Al—Si fibers used as the bonding aid in the examples and the comparative examples. Additionally, concerning talc in cordierite, mica, talc as the bonding aid and the Al—Si fibers as the bonding aid, there are also shown average particle diameters in a major axis direction and a minor axis direction and an aspect ratio which is a ratio of an average size of major axis of the particles to that of the minor axis. It is to be noted that in a case where cordierite is used as the bonding material, alumina and talc are used as forming materials, and these materials react in a firing step to form cordierite. Talc is a raw material of the bonding material, and also used as the bonding aid in the form of anisotropic particles.

TABLE 1

| | Aggregates/ bonding material | | Particle dia. of aggregates/ μm | Bonding aid (anisotropic particles) | | | | Surface porosity A/ % | Inner porosity B/ % | B-A/ % | Surface ave. pore dia. C/ μm | Inner ave. pore dia. D/ μm | D-C/ μm | Pressure loss/kPa | | PN leakage No./ particulates | |
|---|---|---|---|---|---|---|---|---|---|---|---|---|---|---|---|---|---|
| | Type | Ratio | | Particle shape | Type | Long axis side particle dia./ μm | Blend ratio/ wt. % | | | | | | | Measured value | Judgment result | Measured value | Judgment result |
| Example 1 | Silicon carbide/ metal silicon | 75/25 | 28 | Plate | Mica | 25 | 3.0 | 35 | 38 | 3 | 19 | 21 | 2 | 0.88 | Excellent | 9.2 × 10$^7$ | Excellent |
| Example 2 | Silicon carbide/ metal silicon | 75/25 | 28 | Plate | Mica | 25 | 5.0 | 33 | 39 | 6 | 16 | 23 | 7 | 0.73 | Excellent | 7.3 × 10$^7$ | Excellent |
| Example 3 | Silicon carbide/ metal silicon | 75/25 | 28 | Plate | Mica | 25 | 10.0 | 31 | 43 | 12 | 14 | 26 | 12 | 0.92 | Excellent | 4.3 × 10$^7$ | Excellent |
| Example 4 | Silicon carbide/ metal silicon | 75/25 | 10 | Plate | Mica | 25 | 5.0 | 34 | 39 | 5 | 13 | 20 | 7 | 0.93 | Excellent | 3.5 × 10$^7$ | Excellent |
| Example 5 | Silicon carbide/ metal silicon | 75/25 | 60 | Plate | Mica | 25 | 5.0 | 30 | 35 | 5 | 20 | 25 | 5 | 0.68 | Excellent | 6.5 × 10$^8$ | Good |
| Example 6 | Silicon carbide/ metal silicon | 75/25 | 28 | Plate | Mica | 105 | 3.0 | 34 | 37 | 3 | 18 | 21 | 3 | 0.92 | Excellent | 9.5 × 10$^7$ | Excellent |

TABLE 1-continued

| | Aggregates/bonding material | | Particle dia. of aggregates/μm | Bonding aid (anisotropic particles) | | | | | | | | | | Pressure loss/kPa | | PN leakage No./particulates | |
|---|---|---|---|---|---|---|---|---|---|---|---|---|---|---|---|---|---|
| | Type | Ratio | | Particle shape | Type | Long axis side particle dia./μm | Blend ratio/wt.% | Surface porosity A/% | Inner porosity B/% | B-A/% | Surface ave. pore dia. C/μm | Inner ave. pore dia. D/μm | D-C/μm | Measured value | Judgment result | Measured value | Judgment result |
| Example 7 | Silicon carbide/ metal silicon | 75/25 | 28 | Plate | Mica | 105 | 5.0 | 33 | 40 | 7 | 17 | 24 | 7 | 0.71 | Excellent | 7.1 × 10$^7$ | Excellent |
| Example 8 | Silicon carbide/ metal silicon | 75/25 | 28 | Plate | Mica | 105 | 10.0 | 32 | 42 | 10 | 13 | 27 | 14 | 0.89 | Excellent | 4.1 × 10$^7$ | Excellent |
| Example 9 | Silicon carbide/ cordierite | 75/25 | 28 | Plate | Mica | 25 | 3.0 | 36 | 39 | 3 | 20 | 24 | 4 | 0.78 | Excellent | 9.8 × 10$^7$ | Excellent |
| Example 10 | Silicon carbide/ cordierite | 75/25 | 28 | Plate | Mica | 25 | 5.0 | 35 | 41 | 6 | 19 | 26 | 7 | 0.65 | Excellent | 8.3 × 10$^7$ | Excellent |
| Example 11 | Silicon carbide/ cordierite | 75/25 | 28 | Plate | Mica | 25 | 10.0 | 33 | 44 | 11 | 16 | 27 | 11 | 0.73 | Excellent | 5.3 × 10$^7$ | Excellent |
| Example 12 | Silicon carbide/ cordierite | 75/25 | 28 | Plate | Mica | 105 | 3.0 | 36 | 38 | 2 | 21 | 24 | 3 | 0.92 | Excellent | 9.5 × 10$^7$ | Excellent |
| Example 13 | Silicon carbide/ cordierite | 75/25 | 28 | Plate | Mica | 105 | 5.0 | 34 | 42 | 8 | 19 | 26 | 7 | 0.71 | Excellent | 7.1 × 10$^7$ | Excellent |
| Example 14 | Silicon carbide/ cordierite | 75/25 | 28 | Plate | Mica | 105 | 10.0 | 31 | 44 | 13 | 16 | 27 | 11 | 0.91 | Excellent | 6.3 × 10$^7$ | Excellent |
| Example 15 | Silicon carbide/ metal silicon | 75/25 | 28 | Rod | Al—Si fiber | 20 | 1.0 | 36 | 38 | 2 | 21 | 23 | 2 | 0.98 | Excellent | 3.8 × 10$^8$ | Good |
| Example 16 | Silicon carbide/ metal silicon | 75/25 | 28 | Rod | Al—Si fiber | 20 | 3.0 | 37 | 39 | 2 | 21 | 25 | 4 | 0.84 | Excellent | 5.7 × 10$^8$ | Good |
| Example 17 | Silicon carbide/ metal silicon | 75/25 | 28 | Rod | Al—Si fiber | 20 | 5.0 | 37 | 40 | 3 | 22 | 28 | 6 | 0.79 | Excellent | 7.2 × 10$^8$ | Good |
| Comparative Example 1 | Silicon carbide/ metal silicon | 75/25 | 28 | — | — | — | — | 35 | 35 | 0 | 22 | 22 | 0 | 1.26 | Failure | 1.8 × 10$^8$ | Good |
| Comparative Example 2 | Silicon carbide/ cordierite | 75/25 | 28 | — | — | — | — | 38 | 37 | −1 | 24 | 23 | −1 | 1.16 | Failure | 2.3 × 10$^8$ | Good |
| Comparative Example 3 | Silicon carbide/ metal silicon | 75/25 | 28 | Plate | Talc | 25 | 1.0 | 35 | 36 | 1 | 24 | 24 | 0 | 1.67 | Failure | 1.5 × 10$^8$ | Good |
| Comparative Example 4 | Silicon carbide/ metal silicon | 75/25 | 28 | Plate | Talc | 25 | 3.0 | 35.0 | 34.0 | −1 | 28 | 26 | −2 | 2.43 | Failure | 2.2 × 10$^8$ | Good |
| Comparative Example 5 | Silicon carbide/ metal silicon | 75/25 | 28 | Plate | Talc | 25 | 5.0 | 33 | 33 | 0 | 29 | 30 | 1 | 3.16 | Failure | 4.1 × 10$^8$ | Good |
| Comparative Example 6 | Silicon carbide/ metal silicon | 75/25 | 28 | Plate | Mica | 25 | 1.0 | 36 | 37 | 1 | 21 | 22 | 1 | 1.20 | Failure | 1.5 × 10$^8$ | Good |
| Comparative Example 7 | Silicon carbide/ metal silicon | 75/25 | 28 | Plate | Mica | 105 | 1.0 | 35 | 36 | 1 | 21 | 23 | 2 | 1.16 | Failure | 1.4 × 10$^8$ | Good |
| Comparative Example 8 | Silicon carbide/ cordierite | 75/25 | 28 | Plate | Mica | 25 | 1.0 | 38 | 38 | 0 | 22 | 23 | 1 | 1.13 | Failure | 1.8 × 10$^8$ | Good |
| Comparative Example 9 | Silicon carbide/ cordierite | 75/25 | 28 | Plate | Mica | 105 | 1.0 | 36 | 37 | 1 | 22 | 22 | 0 | 1.18 | Failure | 1.6 × 10$^8$ | Good |
| Comparative Example 10 | Silicon carbide/ metal silicon | 75/25 | 28 | Plate | Mica | 25 | 15.0 | 27 | 41 | 14 | 11 | 27 | 16 | 1.83 | Failure | 3.2 × 10$^7$ | Excellent |
| Comparative Example 11 | Silicon carbide/ metal silicon | 75/25 | 28 | Plate | Mica | 105 | 15.0 | 28 | 41 | 13 | 10 | 27 | 17 | 2.02 | Failure | 3.0 × 10$^7$ | Excellent |

TABLE 1-continued

| | Aggregates/ bonding material | | | Bonding aid (anisotropic particles) | | | | | | | | | Pressure loss/kPa | | PN leakage No./ particulates | |
|---|---|---|---|---|---|---|---|---|---|---|---|---|---|---|---|---|
| Type | Type | Ratio | Particle dia. of aggregates/ μm | Particle shape | Type | Long axis side particle dia./ μm | Blend ratio/ wt. % | Surface porosity A/ % | Inner porosity B/ % | B-A/ % | Surface ave. pore dia. C/ μm | Inner ave. pore dia. D/ μm | D-C/ μm | Measured value | Judgment result | Measured value | Judgment result |
| Comparative Example 12 | Silicon carbide/ metal silicon | 75/25 | 6 | Plate | Mica | 25 | 5.0 | 36 | 40 | 4 | 9 | 15 | 6 | 1.42 | Failure | 3.2 × 10⁷ | Excellent |
| Comparative Example 13 | Silicon carbide/ metal silicon | 75/25 | 75 | Plate | Mica | 25 | 5.0 | 31 | 37 | 6 | 16 | 23 | 7 | 0.73 | Excellent | 2.3 × 10⁹ | Failure |

TABLE 2

| | | Bonding material | | | | Bonding aid (anisotropic particles) | | |
|---|---|---|---|---|---|---|---|---|
| | | Aggregates | Metal silicon | Alumina (cordierite) | Talc (cordierite) | Mica | Talc | Al—Si fibers |
| | Unit | Silicon carbide | | | | | | |
| Ave. particle dia. (ave. particle dia. in long dia. direction) | μm | 6/10/28/ 60/75 | 6 | 7 | 9 | 25 | 105 | 25 | 20 |
| Ave. particle dia. in short dia. direction | μm | — | — | — | — | 1 or less | 3 | 3 | 1 or less | 3 |
| Aspect ratio (long dia./short dia.) | — | — | — | — | — | 25 or more | 8.33 | 35.00 | 25 or more | 6.67 |

(2) Calculation of Porosity

For the porosity, a scanning electron microscope (SEM) photograph of a partition wall cross section of each of a surface region and an inner region of each partition wall was photographed, and the porosity was calculated by using a commercially available image analysis software. Further specifically, bipolarization processing of an SEM image of the partition wall cross section was performed by using the image analysis software, areas of a partition wall portion (corresponding to the portion other than the pores) and a pore portion in each of the surface region and the inner region were measured, and the porosity in each region was calculated on the basis of a measured value of each obtained area.

(3) Calculation of Average Pore Diameter

For the average pore diameter, similarly to the calculation of the porosity, the bipolarization processing based on the photographed SEM image of the wall cross section mentioned below was performed by using the image analysis software, pore diameters of the respective pores in each of the surface region and the inner region of each partition wall were measured, and the average pore diameters were calculated from the obtained pore diameters.

(4) Measurement of Pressure Loss

A DPF was prepared from each of the honeycomb structures of the examples and the comparative examples, a pressure of each of an inlet (an upstream side) and an outlet (a downstream side) of the DPF when passing air at room temperature (25° C.) through the filter at a flow rate of 10 Nm³/min. was measured, and the pressure loss was obtained by calculating a difference between the pressures. The obtained measured value of the pressure loss which was 1.0 kPa or less was judged as "excellent" and the measured value in excess of 1.0 kPa was judged as "failure".

(5) Measurement of PN Leakage Number

The DPF formed of each of the honeycomb structures of the examples and the comparative examples was attached to an exhaust system of a vehicle on which a diesel engine having a displacement of 2.0 liters was mounted. The PN leakage number was measured from the total number of the particulates of the particulate matter at the outlet (on the downstream side) of the DPF when this vehicle was run in a new European driving cycle (NEDC) mode. Additionally, the measurement of the number of the particulates of the particulate matter was performed in accordance with a technique suggested by a particulate measurement program (abbreviated to "PMP") by the Working Party on Pollution and Energy of World Forum for Harmonization of Vehicle Regulations in United Nations Economic Commission for Europe. Here, measured values of the PN leakage number which are smaller than $1.0 \times 10^8$ are judged as "excellent", measured values of $1.0 \times 10^8$ or more and $1.0 \times 10^9$ or less are judged as "good", and measured values in excess of $1.0 \times 10^9$ are judged as "failure".

(6) Evaluation of Honeycomb Structure

As shown in Table 1, the DPF prepared on the basis of the honeycomb structure of each of Examples 1 to 17 of the present invention had an excellent or good evaluation in a judgment result of each of the pressure loss and the PN leakage number, whereas the DPF prepared on the basis of the honeycomb structure of each of Comparative Examples 1 to 13 was judged as a failure in at least one of the pressure loss and the PN leakage number. Hereinafter, the respective items will be described in detail.

(6-1) Presence/Absence of Bonding Aid

When the bonding aid was added to the aggregates and the bonding material at a predetermined blend ratio (see Example 1 or the like), the "excellent" or "good" judgment result could be obtained in items of the pressure loss and the PN leakage number. On the other hand, in cases where the bonding aid was not added (Comparative Examples 1 and 2), a value of the pressure loss was high as compared with the case where the bonding aid was added, and the value was in excess of 1.0 kPa of a judgment standard. In consequence, effectiveness of the adding of the bonding aid was indicated.

(6-2) Particle Diameter of Aggregates

In a case where the particle diameters of the aggregates (silicon carbide) for use were changed to 6 μm, 10 μm, 28 μm, 60 μm, and 75 μm and the other conditions of the blend ratio and the like were adjusted to be constant in the respective examples, the excellent or good judgment result was obtained in each item between 10 μm and 60 μm (Examples 2, 4 and 5). On the other hand, in the cases of 6 μm (Comparative Example 12) and 75 μm (Comparative Example 13), the judgment result of failure was obtained in one of the items of the pressure loss and the PN leakage number. Specifically, when the particle diameters of the aggregates were excessively small (Comparative Example 12), an after-mentioned difference between a surface porosity A and an inner porosity B increased in excess of 1.5%, and there was recognized the tendency that the value of the pressure loss increased. On the other hand, when the particle diameters of the aggregates were excessively large (Comparative Example 13), the difference between the surface porosity A and the inner porosity B exceeded 1.5% and the value of the pressure loss increased. In consequence, it was confirmed that the particle diameters of the aggregates were suitably in a range of 10 μm to 60 μm.

(6-3) Type of Bonding Material

As the bonding material, metal silicon was used in the present examples (Examples 1 to 3, etc.) and cordierite was used (Examples 9 to 14, etc.). In this case, a large difference between the types of bonding material was not especially recognized in one of the evaluation items of the pressure loss and the PN leakage number, and it was confirmed that metal silicon and cordierite were usable as the bonding material.

(6-4) Type of Bonding Aid

As the bonding aid (the anisotropic particles) for use, two types of mica which were different in long axis side particle diameters, Al—Si fibers and talc were used. As seen from these results, in the case where the other conditions were adjusted to be the same and in the case where talc was used as the bonding aid, the above judgment standards could not be satisfied in the respective items, whereas in mica and the Al—Si fibers, the excellent or good judgment result could be obtained in each item. Furthermore, large differences in pressure loss and PN leakage number could not be recognized due to differences in particle diameters of mica (see Examples 1 to 3, Examples 4 to 6, etc.). In consequence, it was confirmed that mica and the Al—Si fibers were effective as the bonding aid.

(6-5) Blend Ratio of Bonding Aid (Surface Porosity and Inner Porosity)

In a case where the other conditions of the particle diameters of the aggregates and the like were adjusted to be the same and the blend ratio of the bonding aid to the aggregates and the bonding material was changed to 3.0 wt. %, 5.0 wt. % and 10.0 wt. % in the respective examples (Examples 1 to 3, Examples 6 to 8, Examples 9 to 11 and Examples 12 to 14), there was recognized the tendency that as the blend ratio increased, the value of the surface porosity decreased, whereas the value of the inner porosity increased. Specifically, it was indicated that when a large amount of the bonding aid was added, a lot of voids (pores) were recognized in the inner region of the honeycomb structure, and the porosity of the surface region was not much high.

On the other hand, in a case where the blend ratio of the bonding aid was low (1.0 wt. % in Examples 6 to 9), the tendency that the pressure loss increased was recognized, and in a case where the blend ratio of the bonding aid was high (15.0 wt. % in Comparative Examples 10 and 11), the tendency that the pressure loss increased was similarly recognized.

(6-6) Blend Ratio of Bonding Aid (Surface Average Pore Diameter and Inner Average Pore Diameter)

In a case where the other conditions of the particle diameters of the aggregates and the like were adjusted to be the same and the blend ratio of the bonding aid was changed (Examples 1 to 3, Examples 6 to 8, Examples 9 to 11 and Examples 12 to 14), it was confirmed that as the blend ratio increased, the value of the surface average pore diameter decreases, whereas the value of the inner average pore diameter increased. This tendency is similar to the relations among the surface porosity and the inner porosity and the blend ratio described in the above (6-5).

(6-7) Conclusion of Evaluation

In the case where the other conditions of the particle diameters of the aggregates and the like were adjusted to be the same and the blend ratio of the bonding aid was changed (Examples 1 to 3, Examples 6 to 8, Examples 9 to 11 and Examples 12 to 14), the pressure loss indicated the smallest value in the examples where the bonding aid was added at a blend ratio of 5.0 wt. % (see Example 2 in Examples 1 to 3, Example 7 in Examples 6 to 8, Example 10 in Examples 9 to 11 and Example 13 in Examples 12 to 14). Consequently, in the present examples, it was confirmed that 5.0 wt. % of bonding aid was preferably added to decrease the pressure loss of the partition walls of the honeycomb structure. On the other hand, the PN leakage number was proportional to the blend ratio of the bonding aid, and in a case where the blend ratio was high (10 wt. %), the smallest value of the PN leakage number was indicated (see Example 3, Example 8, Example 11 and Example 14), whereas in a case where the blend ratio was low (3.0 wt. %), the largest value of the PN leakage number was indicated (see Example 1, Example 6, Example 9 and Example 12). Consequently, in accordance with the blend ratio of the bonding aid, the pressure loss can be decreased and the PN leakage number can be controlled.

Furthermore, it was indicated that the blend ratio contributed to the respective values of the surface porosity and the inner porosity, and the surface average pore diameter and the inner average pore diameter in the surface region and the inner region. Specifically, it was confirmed that as the blend ratio of the bonding aid to the aggregates increased in Examples 1 to 17, the values of the surface porosity and the surface average pore diameter changed to gradually decrease, whereas the values of the inner porosity and the inner average pore diameter changed to gradually increase. Therefore, each of the difference between the surface porosity and the inner porosity and the difference between the surface average pore diameter and the inner average pore diameter indicated the highest value in the example where the blend ratio of the anisotropic particles was high (10 wt. %), and the difference indicated the lowest value in the example where the blend ratio of the anisotropic particles was low (3.0 wt. %). That is, when a large amount of the anisotropic particles is blended, control can be executed to increase the differences in porosity and average pore diameter between the surface region and the inner region.

On the other hand, in the cases where the anisotropic particles were not added as the bonding aid (Comparative Examples 1 and 2), suitable results could not be obtained in both the pressure loss and the PN leakage number. That is, the effectiveness of the adding of the anisotropic particles as the bonding aid in the present invention is indicated. Also in the cases where talc was added as the bonding aid, the value of the pressure loss increased, and the effect of the adding of the anisotropic particles could not be obtained (Comparative Examples 3 to 5). Furthermore, in the cases where the blend ratio of the anisotropic particles to be added to the bonding material was low (1.0 wt. % in Comparative Examples 6 to 9), the suitable results could not be obtained in both the evaluation items of the pressure loss and the PN leakage number. Specifically, a difference of porosity in excess of 1.5% could not be formed between the surface region and the inner region. Therefore, such effects as obtained in the present examples cannot be produced.

Furthermore, in the cases where the blend ratio of the anisotropic particles to be added to the bonding material was excessively large (Comparative Examples 10 and 11), the pressure loss increased, and both the examples could not practically be used. However, in such cases, it was indicated that the values of the inner porosity and the surface porosity and the values of the inner average pore diameter and the surface average pore diameter were largest. Also from these results, there was indicated usefulness of the anisotropic particles which were added to the aggregates and the bonding material to form the honeycomb formed body.

A honeycomb structure of the present invention and a manufacturing method of the honeycomb structure can be utilized in manufacturing of the honeycomb structure which can suitably be utilized as a carrier for a catalyst device or a filter in various fields of cars, chemistry, power, steel and the like. In particular, the present invention is suitably used as a DPF to trap a particulate matter included in an exhaust gas of a diesel engine.

DESCRIPTION OF REFERENCE NUMERALS

1: honeycomb structure, 2a: one end face, 2b: the other end face, 3: cell, 4: partition wall, 4a: partition wall surface, 4b: partition wall inner portion, 4c: partition wall back surface, 5: honeycomb structure body, 6a: one open end, 6b: the other open end, 7: plugging portion, 8: aggregates, 9: bonding material, 10: forming material, 11: surface region, 12: inner region, 13: bonding aid (anisotropic particles), 14: bonding portion, M: moving directions of the bonding aid (the anisotropic particles) and the bonding material, and T: partition wall thickness.

What is claimed is:

1. A honeycomb structure comprising porous partition walls defining a plurality of polygonal cells which extends from one end face to an other end face and forms through channels for fluid,
   wherein the porous partition walls include an aggregate material and a bonding material different from the aggregate material, and
   the porous partition walls have a surface porosity of a surface region from a porous partition wall surface of each of the porous partition walls to a depth of 15% of a porous partition wall thickness that is different from an inner porosity of an inner region that is from a depth of 15% to 50% of the porous partition wall thickness from the porous partition wall surface, and
   a difference obtained by subtracting the surface porosity from the inner porosity is in excess of 1.5%.

2. The honeycomb structure according to claim 1, wherein the surface porosity is in a range of 10% to 50%, and
   the inner porosity is in a range of 20% to 75%.

3. The honeycomb structure according to claim 1,
   wherein the bonding material is at least one selected from the group consisting of metal silicon and cordierite.

4. The honeycomb structure according to claim 1,
   wherein the aggregates have a melting point higher than the bonding material, and have an average particle diameter in a range of 10 to 60 micrometers.

5. A honeycomb structure comprising porous partition walls defining a plurality of polygonal cells which extends from one end face to an other end face and forms through channels for fluid,
   wherein the porous partition walls include an aggregate material and a bonding material different from the aggregate material, and
   the porous partition walls have a surface porosity of a surface region from a porous partition wall surface of each of the porous partition walls to a depth of 15% of a porous partition wall thickness that is different from an inner porosity of an inner region that is from a depth of 15% to 50% of the porous partition wall thickness from the porous partition wall surface, and
   a difference obtained by subtracting a surface average pore diameter of the surface region from an inner average pore diameter of the inner region is in excess of 0.5 micrometer.

6. The honeycomb structure according to claim 5,
   wherein the surface average pore diameter is in a range of 5 to 40 micrometers and,
   the inner average pore diameter is in a range of 8 to 50 micrometers.

7. The honeycomb structure according to claim 5, wherein the same aggregate material and the same bonding material different from the aggregate material are used to form the entire thickness of the porous partition walls.

8. A manufacturing method of a honeycomb structure in which the honeycomb structure according to claim 1 is manufactured,
   the method comprising:
   a forming material providing step of mixing aggregates, a bonding material different from a material of the aggregates, and a bonding aid to form a forming material;
   a forming step of extruding the provided forming material to form a honeycomb formed body; and
   a firing step of firing the provided honeycomb formed body to form a honeycomb structure,
   wherein in the forming material providing step, anisotropic particles are used as the bonding aid in which an average size of major axis of the particles is at least 5 micrometers or more, an aspect ratio of the average size of the major axis to an average size of the minor axis is at least 5 or more, and a melting point is lower than that of the bonding material, and the bonding aid is added to and mixed with the aggregates and the bonding material having the melting point lower than the aggregates, and
   in the firing step, the firing is performed at a firing temperature higher than the melting point of the bonding material.

* * * * *